(12) United States Patent
Althaus

(10) Patent No.: US 7,566,992 B2
(45) Date of Patent: Jul. 28, 2009

(54) METHOD AND APPARATUS FOR OPERATION OF A POWER STATION

(75) Inventor: Rolf Althaus, Herrliberg (CH)

(73) Assignee: Alstom Technology Ltd, Baden (CH)

( * ) Notice: Subject to any disclaimer, the term of this patent is extended or adjusted under 35 U.S.C. 154(b) by 0 days.

(21) Appl. No.: 11/635,632

(22) Filed: Dec. 8, 2006

(65) Prior Publication Data

US 2007/0255459 A1 Nov. 1, 2007

Related U.S. Application Data

(63) Continuation of application No. PCT/EP2005/052666, filed on Jun. 9, 2005.

(30) Foreign Application Priority Data

Jun. 11, 2004 (DE) ......................... 10 2004 028 530

(51) Int. Cl.
*H02J 3/46* (2006.01)
(52) U.S. Cl. ............................. 307/73; 307/72; 307/84; 307/149; 307/151; 307/153
(58) Field of Classification Search ............... 307/72–73
See application file for complete search history.

(56) References Cited

U.S. PATENT DOCUMENTS

| 4,593,202 | A | * | 6/1986 | Dickinson | 290/54 |
| 5,039,933 | A | * | 8/1991 | Dong | 322/47 |
| 5,617,738 | A | * | 4/1997 | Ikegami et al. | 62/509 |
| 5,685,155 | A | * | 11/1997 | Brown et al. | 60/698 |
| 6,134,124 | A | * | 10/2000 | Jungreis et al. | 363/34 |
| 6,751,959 | B1 | * | 6/2004 | McClanahan et al. | 60/670 |
| 6,815,934 | B2 | * | 11/2004 | Colley | 322/47 |

(Continued)

FOREIGN PATENT DOCUMENTS

DE 956247 C * 1/1957

(Continued)

OTHER PUBLICATIONS

German Search Report dated Jul. 31, 2007 (with English translation of category of cited documents).

(Continued)

*Primary Examiner*—Stephen W Jackson
*Assistant Examiner*—Adi Amrany
(74) *Attorney, Agent, or Firm*—Buchanan Ingersoll & Rooney PC

(57) ABSTRACT

A power station comprises a power-consuming shaft run on which a motor and a compressor are arranged, as well as a power-emitting shaft run on which a generator and an expansion machine are arranged. The compressor feeds a compressed fluid into a storage volume. The compressed storage fluid is expanded in the expansion machine, producing work. The generator and the motor are connected to the electrical grid system via frequency converters. This makes it possible to operate the electrical machines at a rotation speed which is asynchronous with respect to the grid system. A method and apparatus is disclosed that allows the net power output of the power station to be matched to the demands of the electrical grid system by varying the rotation speed of at least one of the shaft runs.

21 Claims, 1 Drawing Sheet

U.S. PATENT DOCUMENTS

| | | | |
|---|---|---|---|
| 6,954,004 B2 * | 10/2005 | Skeist et al. | 290/44 |
| 6,955,050 B2 * | 10/2005 | Perkins et al. | 60/645 |
| 7,038,330 B2 * | 5/2006 | Rosebrock et al. | 290/44 |
| 7,078,825 B2 * | 7/2006 | Ebrahim et al. | 290/52 |
| 2003/0131599 A1 | 7/2003 | Gerdes | |
| 2004/0008010 A1 * | 1/2004 | Ebrahim et al. | 322/44 |

FOREIGN PATENT DOCUMENTS

| | | |
|---|---|---|
| DE | 2415269 A1 * | 10/1975 |
| DE | 42 13 023 A1 | 10/1993 |

OTHER PUBLICATIONS

International Search Report dated Oct. 18, 2006.
Written Opinion of the International Searching Authority.

* cited by examiner

METHOD AND APPARATUS FOR OPERATION OF A POWER STATION

CROSS REFERENCE TO RELATED APPLICATIONS

This application claims priority under 35 U.S.C. §119 to German Application 10 2004 028 530.6 filed in Germany on 11 Jun. 2004, and as a continuation application under 35 U.S.C. §120 to PCT/EP2005/052666 filed as an International Application on 09 Jun. 2005 designating the U.S., the entire contents of which are hereby incorporated by reference in their entireties.

FIELD

A method and apparatus is disclosed for operation of a power station.

BACKGROUND INFORMATION

By way of examples in the prior art, US 2003/0131599 discloses air-storage power stations in which a compressor compresses air in times in which the electricity demand is low, and feeds this to a storage volume. The air stored there is expanded, producing work, in times of high electricity demand, in an expansion machine, for example a turbine. In this case, the expansion machine drives a generator which supplies power to an electrical grid system. Power stations such as these are particularly suitable for the regulation of the power consumption and emission in an electrical grid system. In the charging mode, in which the compressor is operated, the power consumption of the compressor can be reduced by a constriction, and can thus be matched to a rising power demand in the grid system. In the power mode, in which the expansion machine is operated, the power emission from the expansion machine can be matched by a different constriction of the storage fluid flowing to it and, if required, by a different amount of power from a furnace system to the power demand from the grid system. An electric motor which is used to drive the compressor and a generator which is driven by the expansion machine are rigidly connected, that is to say at a synchronous frequency, to the electrical grid system. The expansion machine and the compressor are thus operated at a constant rotation speed. A turbine which is used as the expansion machine and/or a turbo compressor are then operated at different mass flow levels away from their best operating point. Furthermore, the constriction of flow to the compressor is highly lossy. It should also be remembered that the generator cannot be connected to the grid system, and cannot supply power, until after the expansion machine has been accelerated to the synchronous rotation speed for the grid system.

SUMMARY

A method and apparatus of operation of a power station is disclosed which avoids the discussed disadvantages.

In one aspect, exemplary methods are disclosed for operating a power station, which comprises a power-consuming shaft run and a power-emitting shaft run, such that at least one of the shaft runs is operated at an asynchronous rotation speed with respect to the grid system in a steady operating state, in which case, in contrast for example to machines which are operated at half the grid system frequency, the ratio between the frequency of the AC grid system and the rotation speed of the shaft run is not an integer. During steady state operation such as this, at least one electrical machine, which is being operated at an asynchronous rotation speed with respect to the grid system, is connected to the electrical grid system. In one exemplary embodiment, the rotation speed of an electrical machine is varied while it is connected to the electrical grid system. Such exemplary methods as disclosed allow the power consumption or power emission of a shaft run to be regulated particularly efficiently via its rotation speed. The power consumption or power emission of the entire power station can in this way be highly efficiently matched to the demands from the electrical grid system. Furthermore, such exemplary methods make it possible to react to changes in the power demands very quickly. This can be possible when a means for frequency variation, for example a static frequency converter SFC, is arranged between the electrical machine and the electrical grid system.

In one embodiment, the power consuming shaft run comprises a motor and a compressor. The motor is used to drive the compressor and to compress a storage fluid, in particular air, and to feed it to a storage volume. In this case, power is consumed from the electrical grid system. The power consumption is regulated by variation of the rotation speed. The rotation speed regulation of a compressor is in this case considerably more efficient than, for example, constriction regulation or even blow-out regulation. The compressed storage fluid is stored in the storage volume, and is available for expansion, producing work, in an expansion machine.

The power-emitting shaft run comprises, for example, an expansion machine, for example a turbine, and a generator. In order to feed power into the electrical grid system, compressed storage fluid is taken from the storage volume, is expanded, producing work, in the expansion machine, and the generator is thus driven. The power emitted from the generator is once again regulated via the rotation speed of the shaft run.

The power consumption and/or power emission of the power station are/is regulated by variation of the rotation speed of at least one of the shaft runs, and is thus matched to the demands of the electrical grid system.

In another exemplary method, which can be used when there is a positive power demand from the grid system, e.g., when the power station is in the power mode, in which power is emitted to the grid system, the rotation speed of the power-emitting shaft run is increased when the power demand rises, and the rotation speed of the power-emitting shaft run is reduced when the power demand decreases, with the generator being connected to the grid system all the time. In yet another exemplary method, which can be used when there is a negative power demand from the grid system, with power being taken from the grid system, e.g., in the charging mode of the power station, the rotation speed of the power-consuming shaft run is reduced when the power demand increases, and the rotation speed of the power-consuming shaft run is increased when the power demand falls, with the motor being connected to the grid system all the time.

In yet another embodiment of the method, power is additionally taken from the grid system, and a storage fluid which is contained in the storage volume is heated. This makes it possible to react very quickly to a falling power demand in the grid system. In one embodiment, when the power demand from the grid system falls, the heating power taken from the grid system is increased, and the rotation speed and thus the power consumption of the power-consuming shaft run are increased, and the heating power is reduced again. It is likewise possible when the power demand from the grid system is falling for the heating power which is taken from the grid system to be increased in the power mode, for the rotation speed and thus the power emitted from the power-emitting shaft run to be successively reduced, and for the heating power to be reduced again.

Further possible variants of such exemplary methods as well as embodiments of power stations which are suitable for carrying out the method will become evident to a person skilled in the art on the basis of the exemplary embodiment described in the following text.

BRIEF DESCRIPTION OF THE DRAWING

The invention will be explained in more detail in the following text with reference to an exemplary embodiment, which is illustrated in the drawing.

The single FIGURE shows an exemplary power station which is suitable for carrying out the method as disclosed.

Figure 1:
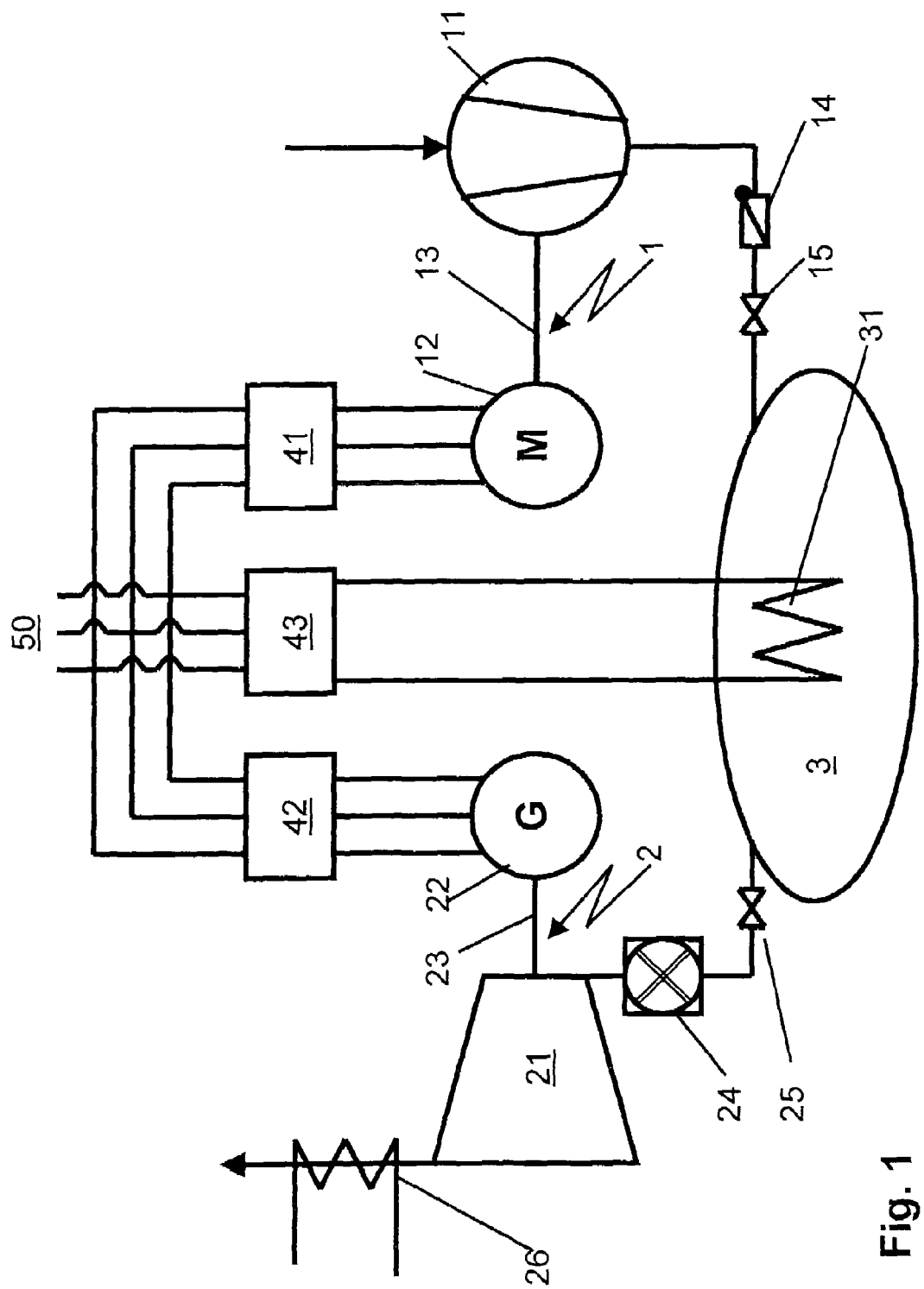

The exemplary embodiment and the FIGURE should be understood as being explanatory and should not be used to restrict the disclosed subject matter.

DETAILED DESCRIPTION

FIG. 1 illustrates an exemplary power station which is suitable for carrying out the exemplary method as disclosed. Such an exemplary power station comprises a power-consuming shaft run 1, a power-emitting shaft run 2 and a storage volume 3. A compressor 11 and a drive motor 12 are arranged on a common shaft 13 on the power-consuming shaft run. An expansion machine 21 and a generator 22 are arranged on a common shaft 23 on the power-emitting shaft run. It is not necessary for all of the machines which are arranged on one shaft run to be arranged on a common shaft; for example, clutches or transmissions can be arranged without any problems in the shaft run and allow the machines on one shaft run to be operated at different rotation speeds to one another. The illustrated power station can be operated not only to consume power but also to emit power in an electrical grid system 50. In this case, on the one hand, the power consumption of the compressor 11 is greater than the power emitted from the expansion machine 21, and in the other operating situation, the power emitted from the expansion machine 21 is greater than the power consumption of the compressor 11. The motor 12 consumes power from the electrical grid system 50. The compressor 11 is thus driven, compresses air and feeds it to the storage volume 3. In this case, a non-return device 14 and a shut-off device 15 are arranged between the compressor and the storage volume. Compressed fluid can be supplied from the storage volume 3 to the expansion machine 21 via a shut-off and control device 25. This fluid is expanded, producing work, as it flows through the expansion machine, thus driving the generator 22, which supplies power to the electrical grid system 50. A combustion chamber 24 makes it possible to supply heat to the expansion process in advance, to the fluid flowing to the expansion machine. The enthalpy gradient, which is available on a mass-specific basis, and thus the work, which is produced on a mass-flow-specific basis, thus become greater during the expansion process. If appropriate combustion is carried out upstream of the expansion machine, then the exhaust gas flowing out of the expansion machine will in general be at a high temperature. An exhaust-gas heat exchanger 26 is thus provided and extracts remaining heat from the fluid flowing out of the expansion machine 21. This remaining heat can be used, for example, for remote heating, for steam generation for driving a steam turbine, for process purposes and the like. A heat exchanger can also be provided instead of the combustion chamber 24, in which heat is supplied to the storage fluid. Furthermore, an apparatus for supplying heat to the storage fluid can also be entirely omitted. In one operating variant of the illustrated exemplary power station, the electrical machines 12 and 22 are operated in synchronism with the grid system, that is to say the rotation speed of the electrical machines corresponds to the frequency of the AC grid system 50. In one operating variant, the power station is operated such that the mass flow passed through the compressor 11 is equal to the mass flow passed through the expansion machine 21. The power station can also be operated in the charging mode, in which the mass flow passing through the compressor 11 is greater than the mass flow passing through the expansion machine 21. In this case, the net power output of the power station falls. In one operating state, the power consumption of the compressor 11 is greater than the power emitted from the expansion machine 21. In another exemplary operating state, the power consumption of the compressor 11 is reduced, so that the net power output of the power station rises. In general, the mass flow passing through the expansion machine 21 is then greater than that passed through the compressor, in such a manner that the storage volume 3 is emptied. This is the discharge operating state of the power station. The illustrated exemplary power station is in consequence able to cope with power demands from the electrical grid system to a major extent, from the power mode to operation with a power extraction removal, in that, on the one hand, the power consumption of the compressor and on the other hand the power emitted from the expansion machine are changed independently of one another. A heating apparatus 31 is also arranged in the storage volume 3. Power can be taken from the grid system 50 by means of the heating apparatus 31, with very high gradients. The capability to cope with rapid changes in the power demand of an electrical grid system in both directions, both when the power demand is rising and when the power demand is falling, represents a very major competitive advantage in liberalized electricity markets. The power of turbomachines such as the turbine 21 that is used as the expansion machine and in particular of a turbocompressor 11 can be varied particularly efficiently by variation of the rotation speed. However, because the electrical grid system 50 is operated at a fixed grid system frequency, rotation speed regulation of the machines which are connected to it requires the machines to be operated asynchronously. Frequency conversion apparatuses, for example static frequency converters, SFC, 41, 42, are thus arranged between the motor 12 and the generator 22 on the one hand and the electrical grid system 50 on the other hand, and allow the electrical machines 12 and 22 to be operated at an asynchronous rotation speed with respect to the grid system, even in the power mode. Accordingly, the exemplary power station can be operated such that, when the power demand of the electrical grid system rises, the rotation speed of the power-emitting shaft run 2 is increased, and/or the rotation speed of the power-consuming shaft run 1 is reduced. When the power demand from the electrical grid system falls, the rotation speed of the power-emitting shaft run 2 is reduced, and/or the rotation speed of the power-consuming shaft run 1 is increased. The net power output of the power station may in this case not only be positive, that is to say with power being emitted to the grid system, but also negative, with power being consumed overall from the grid system. A further possible way to influence the power consumption of the power station is represented by the heating apparatus 31. If the power demand from the grid system falls very quickly, the heating apparatus 31 is started up via the control element 43 or its power is increased, consuming power from the electrical grid system, and heating the fluid which is stored in the storage volume, thus raising the pressure of the fluid in the storage volume 3. The heating power can be changed virtually instantaneously, while in contrast the rotation speed of the shaft runs can admittedly be varied quickly, but not indefinitely quickly, because of the inertia and the control requirements. In one exemplary embodiment, the power of the heating apparatus 31 can thus be increased virtually instantaneously when the power demand from the electrical grid system 50 falls rapidly. In a next step, the rotation speed of the power-consuming shaft run 1 is then increased, and/or the rotation speed of the power-emitting shaft run 2 is reduced. The heating power of the heating apparatus 31 is then reduced to the same extent as that to which the power balance of the electrical machines 12 and 22 is changed, and whose net power output is thus reduced. It is, of course, likewise possible to operate the heating apparatus 31 continuously, in order to preheat the storage fluid for the expansion machine. When the power demand from the grid system rises, the power consumption of the heating apparatus can then be reduced quickly. In a next step, the rotation speed of the power-emitting shaft run 2 is then increased, and/or the rotation speed of the power-consuming shaft run 1 is reduced. The heating power can then be increased again successively.

In the light of the exemplary embodiments explained above and of the patent claims a person skilled in the art would deduce further embodiments of the operating method according to the invention which are in no way coupled to the power station described by way of example.

It will be appreciated by those of ordinary skill in the art that the exemplary circuit breakers described here can be embodied in various specific forms without departing from the essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

List of reference symbols
1 Power-consuming shaft run
2 Power-emitting shaft run
3 Storage volume
11 Compressor
12 Electrical machine, motor
13 Shaft
14 Non-return device
15 Control and/or shut-off device
21 Expansion machine, turbine
22 Electrical machine, generator
23 Shaft
24 Combustion chamber
25 Control and/or shut-off device
31 Heating apparatus
41 Frequency converter, static frequency converter SFC
42 Frequency converter, static frequency converter SFC
43 Heating power control unit
50 Electrical grid system

The invention claimed is:

1. A method for operation of a power station in an AC grid system, the power station having: an electrical machine with a power-consuming shaft run; an electrical machine with a power-emitting shaft run; and a frequency converter connected between the grid system and at least one of the electrical machines, wherein the frequency converter allows at least one of the shaft runs to operate at an asynchronous rotation speed with respect to the grid system, with the ratio between the frequency of the AC grid system and the rotation speed of the shaft run not being an integer, and wherein the power consumption and/or power emission of the power station is regulated by variation of the rotation speed of at least one of the shaft runs while the electrical machine of the shaft run being regulated is connected to the grid system.

2. The method as claimed in claim 1, with the power-consuming shaft run comprising a motor and a compressor.

3. The method as claimed in claim 2, comprising the driving of the compressor and the compression of a storage fluid, and feeding this to a storage volume.

4. The method as claimed in claim 3, wherein the storage fluid is air.

5. The method as claimed in claim 1, with the power-emitting shaft run comprising an expansion machine and a generator.

6. The method as claimed in claim 5, comprising a compressed storage fluid, in particular air, being taken from a storage volume, the storage fluid being expanded in the expansion machine, producing work, and the driving of the generator.

7. The method as claimed in claim 1, wherein, as the power demand from the grid system rises, the rotation speed of the power-emitting shaft run is increased, and as power demand from the grid system falls, the rotation speed of the power-emitting shaft run is reduced, with the generator being connected to the grid system all the time.

8. The method as claimed in one of claim 7, wherein, when the power demand from the grid system rises, the rotation speed of the power-consuming shaft run is reduced, and when the power demand from the grid system falls, the rotation speed of the power-consuming shaft run is increased, with the motor being connected to the grid system all the time.

9. The method as claimed in claim 8, comprising power being taken from the grid system and being used to heat a storage fluid which is contained in a storage volume.

10. The method as claimed in claim 9, wherein, when the power demand from the grid system falls, the heating power taken from the grid system is increased, the rotation speed of the power-consuming shaft run is increased, and the heating power is reduced.

11. The method as claimed in claim 10, comprising the heating power being reduced to zero.

12. The method as claimed in claim 9, wherein, when the power demand from the grid system falls, the heating power taken from the grid system is increased, the rotation speed of the power-emitting shaft run is reduced, and the heating power is reduced.

13. The method as claimed in claim 12, comprising the heating power being reduced to zero.

14. The method as claimed in claim 1, wherein the at least one of the shaft runs is operated at an asynchronous rotation speed with respect to the grid system in a steady operating state.

15. The method as claimed in claim 1, wherein the power consumption and/or power emission of the power station can be regulated by variation of the rotation speed of at least one of the shaft runs.

16. The method as claimed in claim 1, wherein, when the power demand from the grid system rises, the rotation speed of the power-consuming shaft run is reduced, and when the power demand from the grid system falls, the rotation speed of the power-consuming shaft run is increased, with the motor being connected to the grid system all the time.

17. The method as claimed in claim 1, comprising power being taken from the grid system and being used to heat a storage fluid which is contained in a storage volume.

18. A power station in an AC grid system being operated according to the method as claimed in claim 1.

19. An apparatus for use in an AC grid system, comprising:
   a power-consuming shaft run on which a motor and a compressor are arranged, and
   a power-emitting shaft run on which a generator and an expansion machine are arranged, wherein the generator and the motor are connected to the AC grid system via frequency converters so that at least one of the motor and the generator is capable of operating at a rotation speed which is asynchronous with respect to the AC grid system.

20. The apparatus as claimed in claim 19, wherein the compressor feeds a compressed fluid into a storage volume.

21. The apparatus as claimed in claim 20, wherein the compressed storage fluid is expanded in the expansion machine to produce work.

* * * * *